United States Patent
Kimura

(10) Patent No.: US 9,068,863 B2
(45) Date of Patent: Jun. 30, 2015

(54) ENCODER

(71) Applicant: MITUTOYO CORPORATION, Kawasaki-shi, Kanagawa (JP)

(72) Inventor: Akihide Kimura, Kawasaki (JP)

(73) Assignee: MITUTOYO CORPORATION, Kawasaki-Shi (JP)

( * ) Notice: Subject to any disclaimer, the term of this patent is extended or adjusted under 35 U.S.C. 154(b) by 237 days.

(21) Appl. No.: 13/860,158

(22) Filed: Apr. 10, 2013

(65) Prior Publication Data

US 2013/0270428 A1 Oct. 17, 2013

(30) Foreign Application Priority Data

Apr. 11, 2012 (JP) ................................. 2012-090123

(51) Int. Cl.
G01D 5/34 (2006.01)
G01D 5/347 (2006.01)

(52) U.S. Cl.
CPC . *G01D 5/347* (2013.01); *G01D 5/34* (2013.01)

(58) Field of Classification Search
USPC ............ 250/231.1–231.18; 33/706, 707, 1 N, 33/1 PT; 341/616, 617
See application file for complete search history.

(56) References Cited

U.S. PATENT DOCUMENTS

| 4,914,437 A * | 4/1990 | Kibrick et al. ..................... 341/3 |
| 6,617,572 B2 * | 9/2003 | Ishizuka ................... 250/237 G |
| 2004/0007664 A1 * | 1/2004 | Mitchell ................... 250/237 G |

FOREIGN PATENT DOCUMENTS

| EP | 2267414 | 12/2010 |
| JP | 63-41493 | 8/1988 |
| JP | 1-31127 | 6/1989 |
| JP | 07-128091 | 5/1995 |
| JP | 11-132793 | 5/1999 |
| JP | 2004-177281 | 6/2004 |

OTHER PUBLICATIONS

European Search Report dated Jul. 15, 2013, 5 pages.

* cited by examiner

*Primary Examiner* — Renee D Chavez
(74) *Attorney, Agent, or Firm* — Rankin, Hill & Clark LLP

(57) ABSTRACT

A first reference pattern has a plurality of patterns, which are arranged periodically in a measurement axis direction and have the same width in the measurement axis direction. The plurality of patterns have the respective different pitches. At least one of the plurality of patterns is smaller in pitch than a first main signal pattern. A second sensor has a plurality of detection regions which are in one-to-one correspondence with the plurality of patterns of the first reference pattern. An addition calculating section calculates an addition signal by adding up output signals of the plurality of detection regions. A square calculating section calculates a squared signal from the addition signal. A judging section outputs a reference signal for determination of a reference position according to signal levels of the squared signal.

2 Claims, 4 Drawing Sheets

ENCODER

CROSS-REFERENCE TO RELATED APPLICATION(S)

The present application claims the benefit of priority of Japanese Patent Application No. 2012-090123, filed on Apr. 11, 2012. The disclosures of this application are incorporated herein by reference.

BACKGROUND

Technical Field

The present invention relates to an encoder. More particularly, the invention relates to an encoder in which the reproducibility of detection of a reference position can be increased while the structures of reference patterns are simplified.

The encoder as disclosed in Patent document 1 is known. This encoder is equipped with a main scale, a first sensor, and a second sensor. The main scale has a main signal pattern which is periodic in the measurement axis direction and a reference pattern for determination of a reference position in the measurement axis direction. The first sensor and the second sensor are opposed to the main scale and are movable relative to the main scale in the measurement axis direction. The first sensor detects a variation of the relative position of the main signal pattern in the measurement axis direction. The second sensor detects how close to it the reference pattern is located. The encoder can output a signal indicating a movement length of the main scale on the basis of an output signal of the first sensor using, as a reference, a reference position that is determined on the basis of an output signal of the second sensor. That is, this type of encoder outputs a signal indicating a position relative to a power-on position and is equipped with the second sensor as a means for determining a reference position for that purpose.

Patent documents 2-5 disclose means for determining a reference position which are similar to the means disclosed in Patent document 1. Incidentally, Patent document 2 discloses a technique for detecting a position variation of reflection light from a pattern by triangulation. This technique is advantageous in that the principle of determination of a reference position is simple. Patent document 3 discloses a technique for detecting transmission light through one slit. This technique is advantageous in that the principle of detection of a reference position is simple. Patent document 4 discloses a technique for pattern matching between a positive pattern and a negative pattern. This technique is advantageous in that the reproducibility of detection of a reference position is higher than in the method of Patent document 3. Patent document 5 is advantageous in that a narrow-width pulse signal for determination of an absolute position can be obtained by adding a total of eight kinds of patterns together which are a pattern having a certain pitch and patterns having pitches that are integer multiples of the certain pitch.

PRIOR ART DOCUMENTS

Patent Documents

[Patent document 1] JP-A-2004-177281
[Patent document 2] JP-A-11-132793
[Patent document 3] JP-B-63-41493
[Patent document 4] JP-A-7-128091
[Patent document 5] JP-B-01-31127

For example, the encoder of Patent document 1 determines a reference position using a reference pattern formed at one location. In Patent document 1, the reference pattern is a random pattern, whereby a sharp pulse signal is obtained as a reference signal for determination of a reference position.

If it is attempted to obtain a sharp pulse signal as a reference signal to increase the reproducibility of detection of a reference position according to the above method, it becomes necessary to form an even finer reference pattern. However, in this case, the finer reference pattern diffracts light more strongly, as a result of which the quantity of light that reaches the second sensor decreases. That is, the method disclosed in Patent document 1 has a limit in increase of the reproducibility of detection of a reference position (similar limits also exist in Patent documents 2-4). In addition, the random pattern as the reference pattern is complex. An attempt to form an even finer reference pattern would cause cost increase because it is necessary to maintain the accuracy of formation of such a complex pattern (such cost increase would also occur in the method of Patent document 5 which uses complex patterns (a total of eight kinds of patterns are used)). The above circumstances would not be restricted to reference position detection methods using light.

SUMMARY

Exemplary embodiments of the invention provide an encoder which can increase the reproducibility of detection of a reference position while simplifying the structures of reference patterns.

An encoder according to an exemplary embodiment comprises:

a main scale having a first main signal pattern being periodic in a measurement axis direction and a first reference pattern for determination of a reference position in the measurement axis direction;

a first sensor and a second sensor which are opposed to the main scale and are movable relative to the main scale in the measurement axis direction, the first sensor detecting a variation of the relative position of the first main signal pattern in the measurement axis direction, the second sensor detecting how close to it the first reference pattern is located; and a signal processor configured to output a signal indicating a movement length of the main scale on the basis of an output signal of the first sensor using, as a reference, a reference position that is determined on the basis of an output signal of the second sensor, wherein:

the first reference pattern has a plurality of patterns which are arranged in the measurement axis direction and have the same width in the measurement axis direction, the plurality of patterns being periodic in the measurement axis direction with the respective different pitches, at least one of the plurality of patterns being smaller in pitch than the first main signal pattern;

the second sensor has a plurality of detection regions which are in one-to-one correspondence with the plurality of patterns of the first reference pattern; and the signal processor comprises:

an addition calculating section configured to calculate an addition signal by adding up output signals of the plurality of detection regions of the second sensor;

a square calculating section configured to calculate a squared signal by squaring the addition signal at least once; and a judging section configured to output a reference signal for determination of a reference position according to signal levels of the squared signal.

The encoder further comprises:

an index scale which is opposed to the main scale and is movable relative to the main scale in the measurement axis direction and has a second main signal pattern and a second reference pattern which correspond to the first main signal pattern and the first reference pattern, respectively, wherein:

the first sensor and the second sensor are photoelectric sensors; and the first sensor detects light coming from the second main signal pattern via the first main signal pattern and the second sensor detects light coming from the second reference pattern via the first reference pattern.

The invention makes it possible to increase the reproducibility of detection of a reference position while simplifying the structures of reference patterns (first reference pattern and second reference pattern).

DETAILED DESCRIPTION

An exemplary embodiment of the present invention will be hereinafter described in detail with reference to drawings.

An encoder 100 according to an embodiment of the present invention will be hereinafter described in detail with reference to FIGS. 1-6.

First, the configuration of the encoder 100 according to the embodiment will be described by mainly referring to FIGS. 1-4.

Figure 1:
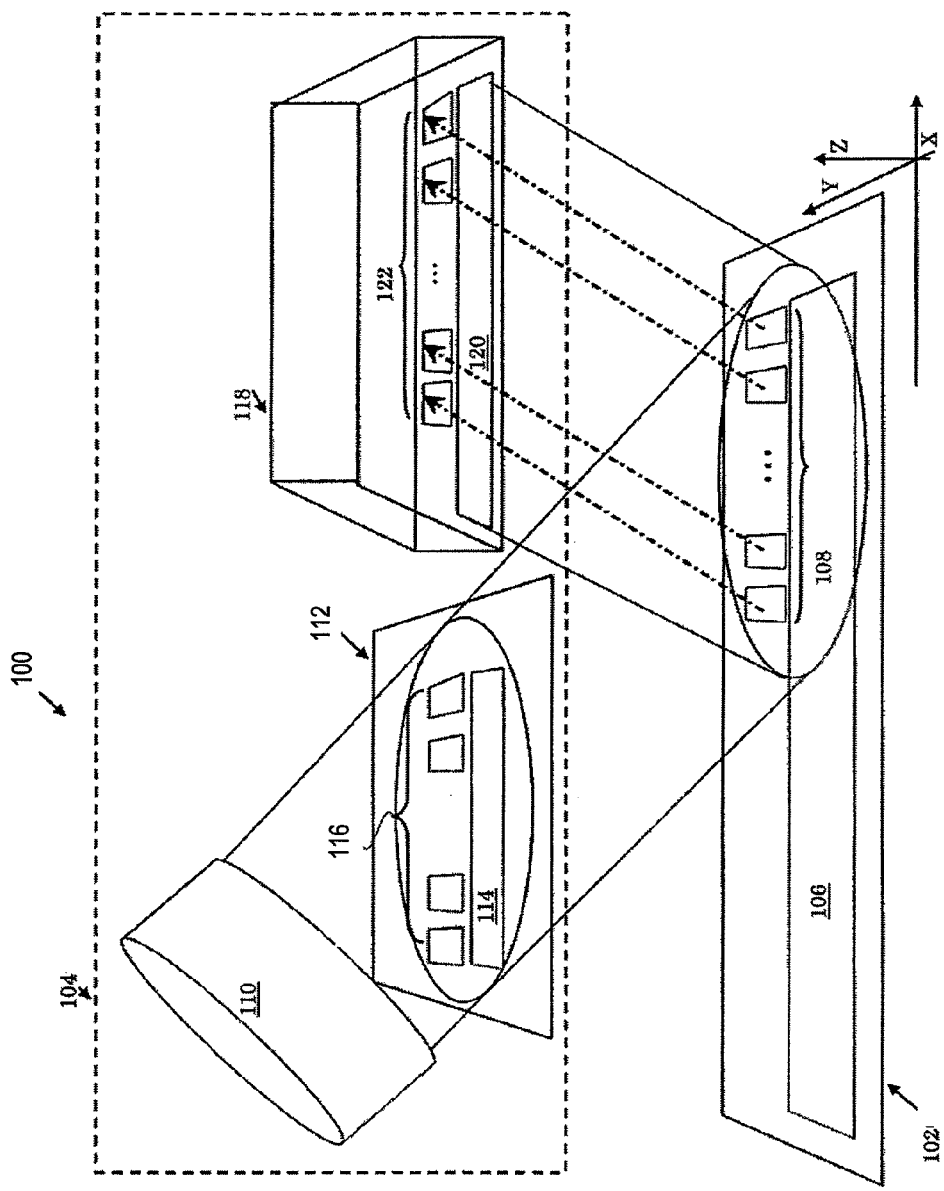
FIG. 1 is a schematic perspective view of an encoder according to an embodiment of the present invention.
Figure 4:
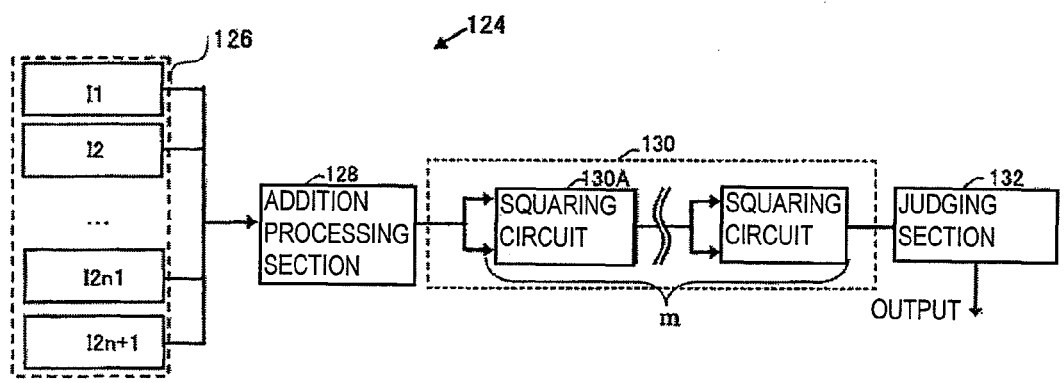
FIG. 4 is a block diagram of a signal processor of the encoder according to the embodiment.

As shown in FIGS. 1 and 4, the encoder 100 has a main scale 102, a detection head 104, and a signal processor 124. In practice, the main scale 102 and the detection head 104 are disposed so close to each other as to be almost in contact with each other. The signal processor 124 may be provided inside the detection head 104.

Figure 2:
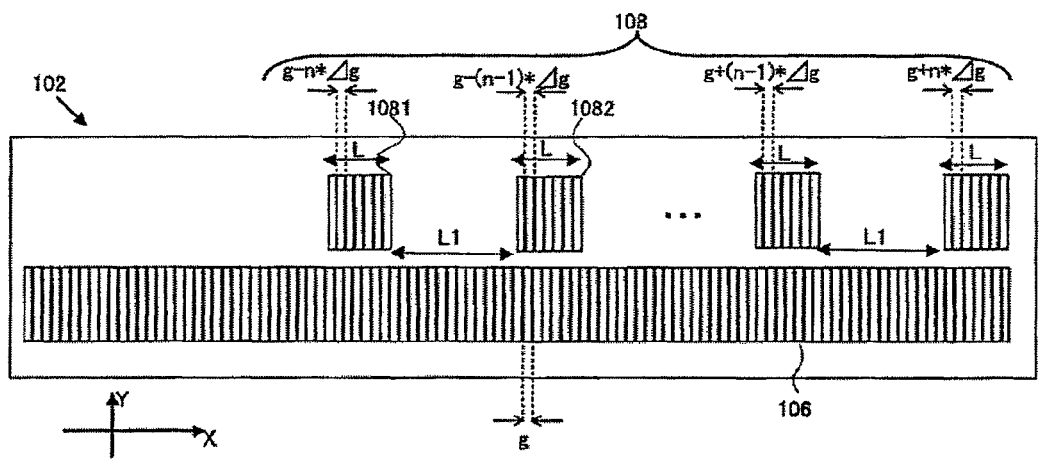
FIG. 2 is a schematic plan view of a main scale of the encoder according to the embodiment.

As shown in FIGS. 1 and 2, the main scale 102 is a reflection-type scale which is provided with a first main signal pattern 106 and a first reference pattern 108.

As shown in FIG. 2, the first main signal pattern 106 extends almost over the entire main scale 102 so as to be periodic (pitch: g) in the direction of a measurement axis X.

As shown in FIG. 2, the first reference pattern 108 which is a pattern for determination of a reference position in the measurement axis X direction is disposed in the vicinity of one end of the main scale 102. Like the first main signal pattern 106, the first reference pattern 108 is formed so as to be periodic in the measurement axis X direction. The first reference pattern 108 has (2n+1) patterns 1081, 1082, ... (n: integer) which are arranged in the measurement axis X direction and formed adjacent to the first main signal pattern 106 in the Y direction. The (2n+1) patterns 1081, 1082, ... have the same width L in the measurement axis X direction, respectively. The pitch of the individual pattern (1081, 1082, ...) of the first reference pattern 108 varies at a rate of $\Delta g$ (<g). The pitch (g−n×$\Delta g$) of one pattern 1081 is smaller than the pitch g of the first main signal pattern 106 when n=1. The value $\Delta g$ is determined in relation to the number n so that the pitch (g−n×$\Delta g$) does not become unduly smaller than the pitch g. In the embodiment, it is desirable that $\Delta g$ be 20% to 30% of g when n=1. The interval L1 between the patterns 1081, 1082, ... of the first reference pattern 108 is set as long as possible though it is restricted in relation to the sizes of an index scale 112 and a detection unit 118 of the detection head 104.

As shown in FIG. 1, a light source 110, the index scale 112, and the detection unit 118 are integrated to constitute the detection head 104. The detection head 104 is opposed to the main scale 102, and can be moved relative to the main scale 102 in the measurement axis X direction.

As shown in FIG. 1, the light source 110 is a diffusive light source and applies light to the main scale 102 via the index scale 112.

As shown in FIG. 1, the index scale 112 has a second main signal pattern 114 and a second reference pattern 116 which correspond to the first main signal pattern 106 and the first reference pattern 108, respectively. More specifically, the second main signal pattern 114 has the same pitch g as the first main signal pattern 106. The second reference pattern 116 has (2n+1) patterns that are in one-to-one correspondence with the patterns 1081, 1082, ... of the first reference pattern 108. That is, like the first reference pattern 108, the second reference pattern 116 has (2n+1) patterns which are arranged in the measurement axis X direction and formed adjacent to the second main signal pattern 114 in the Y direction. The (2n+1) patterns have the same width L in the measurement axis X direction, respectively. The pitch of the individual pattern of the second reference pattern 116 varies at a rate of $\Delta g$. The pitch (g−n×$\Delta g$) of one of the (2n+1) patterns is smaller than the pitch g of the first main signal pattern 106 (i.e., the pitch of the second main signal pattern 114) when n=1. The interval between the (2n+1) patterns of the second reference pattern 116 is set equal to the interval L1 between the patterns 1081, 1082, ... of the first reference pattern 108.

As shown in FIG. 1, the detection unit 118 has a first sensor 120 and a second sensor 122. Each of the first sensor 120 and the second sensor 122 is a photoelectric sensor which is an array sensor having plural light reception regions in the measurement axis X direction. (Alternatively, each of the first sensor 120 and the second sensor 122 may be a sensor in which optical gratings are formed in respective regions and a single light reception area is provided downstream of those regions.) As described above, the encoder 100 is constructed so as to determine a movement length of the main scale 102 according to the three-grating principle.

As shown in FIG. 1, the first sensor 120 receives light that is reflected from the first main signal pattern 106. That is, the first sensor 120 detects light coming from the second main signal pattern 114 via the first main signal pattern 106 and outputs a resulting light/dark signal. Therefore, the first sensor 120 can detect a variation of the relative position of the first main signal pattern 106 in the measurement axis X direction. The array pitch of the first sensor 120 is often set to be g/4 in order to obtain, from the first main signal pattern 106, four-phase sinusoidal signals having phase differences of 1/4 period.

As shown in FIG. 1, the second sensor 122 receives light that is reflected from the first reference pattern 108. That is, the second sensor 122 detects light coming from the second reference pattern 116 via the first reference pattern 108 and outputs a resulting light/dark signal. The second sensor 122 has (2n+1) light reception regions which are in one-to-one correspondence with the (2n+1) patterns 1081, 1082, . . . of the first reference pattern 108. More specifically, like the first reference pattern 108, the second sensor 122 has the (2n+1) light reception regions which are arranged in the measurement axis X direction and formed adjacent to the first sensor 120 in the Y direction. The (2n+1) light reception regions have the same width L in the measurement axis X direction, respectively. The array pitch of the second sensor 122 is equal to the pitch of the (2n+1) patterns 1081, 1082, . . . of the first reference pattern 108. The array pitch of the individual light reception region (2n+1) of the second sensor 122 varies at a rate of $\Delta g$. The array pitch $(g-n \times \Delta g)$ of one of the light reception regions is smaller than the pitch g of the first main signal pattern 106 (i.e., the array pitch of the first sensor 120) when n=1. The interval between the (2n+1) light reception regions of the second sensor 122 is set equal to the interval L1. Therefore, the second sensor 122 can detect how close to it the first reference pattern 108 is located.

Each of the (2n+1) light reception regions of the second sensor 122 may be formed so as to produce sinusoidal light/dark signals having a 90° phase difference. In this case, the influence of noise on a reference signal can be reduced by obtaining a differential signal from the light/dark signals.

As shown in FIG. 4, the signal processor 124 is equipped with a signal conversion section 126 which is connected to the second sensor 122, an addition calculating section 128, a square calculating section 130, and a judging section 132. The signal processor 124 is also equipped with a position calculating section (not shown) which is connected to the first sensor 120. A relative movement length of the main scale 102 can be calculated and output on the basis of an output of the first sensor 120. The technique of calculating and outputting a relative movement length of the main scale 102 which is based on the three-grating principle is known and hence will not be described below.

Figure 3:
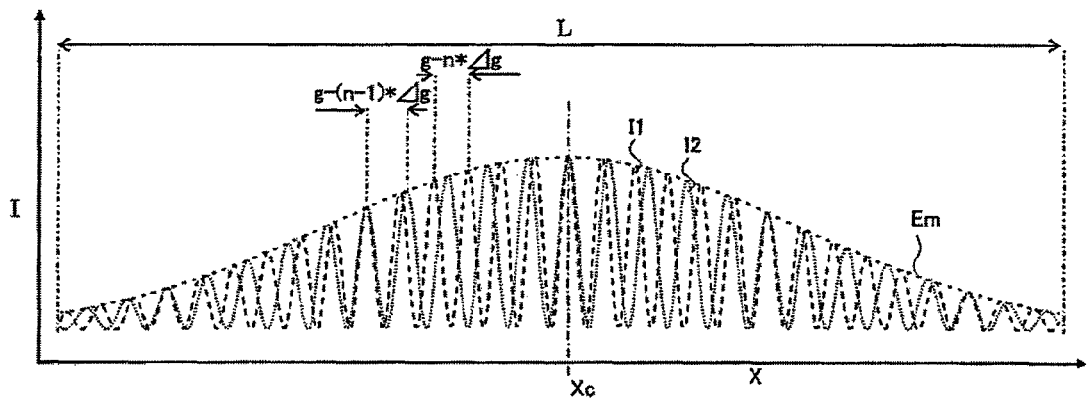
FIG. 3 is a graph showing output signals I of a second sensor of the encoder according to the embodiment.

The signal conversion section 126 which is connected to the (2n+1) light reception regions of the second sensor 122 (see FIG. 4) converts outputs of the second sensor 122 into voltage values and output them as output signals I. For example, FIG. 3 shows output signals I1 (broken line) and I2 (dotted line) of the light reception regions, corresponding to the respective patterns 1081 and 1082 of the first reference pattern 108, of the second sensor 122 which are obtained when the first reference pattern 108 and the second reference pattern 116 just coextend with each other optically. In FIG. 3, the vertical axis represents the magnitude of the output signal I and the horizontal axis represents the position on the measurement axis X on the second sensor 122. As seen from FIG. 3, the phases of the output signals I1 and I2 coincide with each other at a position Xc which corresponds to the center of the second sensor 122 and the phase difference between the output signals I1 and I2 increases as the position goes away from the position Xc. The reason why an envelope Em of the output signals I are narrow in end portions of the graph of FIG. 3 and wide in its central portion (i.e., around the position Xc) is that the light that enters the second sensor 122 is restricted because the patterns 1081 and 1082 of the first reference pattern 108 and the corresponding patterns of the second reference pattern 116 have the width L.

Figure 5A:
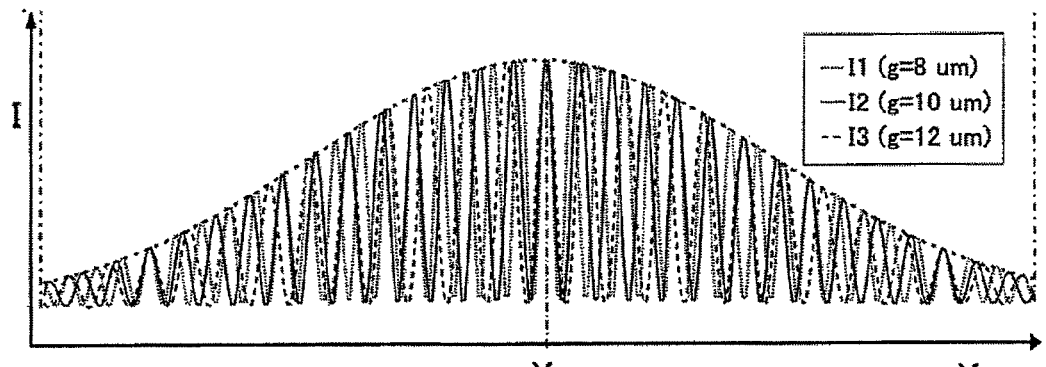
FIG. 5A is a graph of output signals I which are obtained as an example procedure for producing a reference signal proceeds in the encoder according to the embodiment.
Figure 5B:
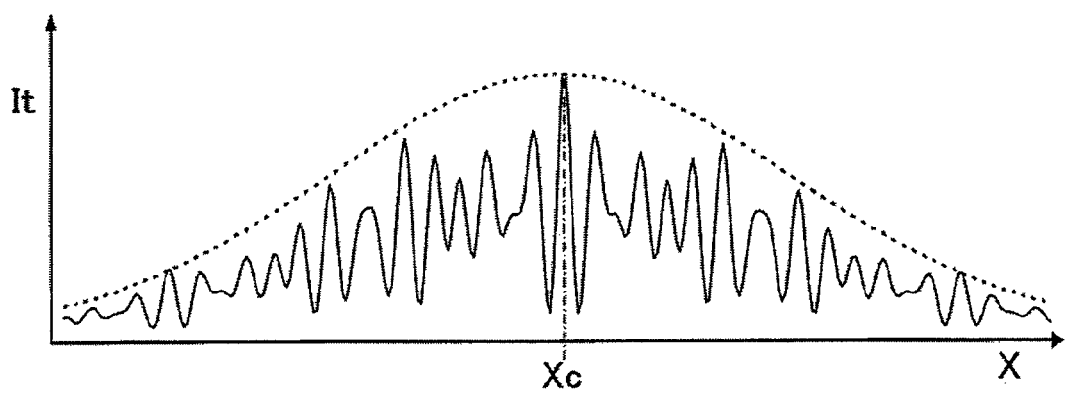
FIG. 5B is a graph of an addition signal It which is obtained as an example procedure for producing a reference signal proceeds in the encoder according to the embodiment.

The addition calculating section 128 which is connected to the signal conversion section 126 (see FIG. 4) calculates an addition signal It by adding up the output signals I (I1, I2, . . . , I2n+1). As shown in FIGS. 3 and 5A, the output signals I (I1, I2, . . . , I2n+1) wave in such a manner that their phases coincide with each other at the position Xc and are different from each other at other positions. Therefore, when the output signals I are added up, only the peaks at the position Xc pile up whereas the other peaks do not. As a result, as shown in FIG. 5B, the addition signal It has a relatively high and sharp peak at the position Xc.

Figure 5C:
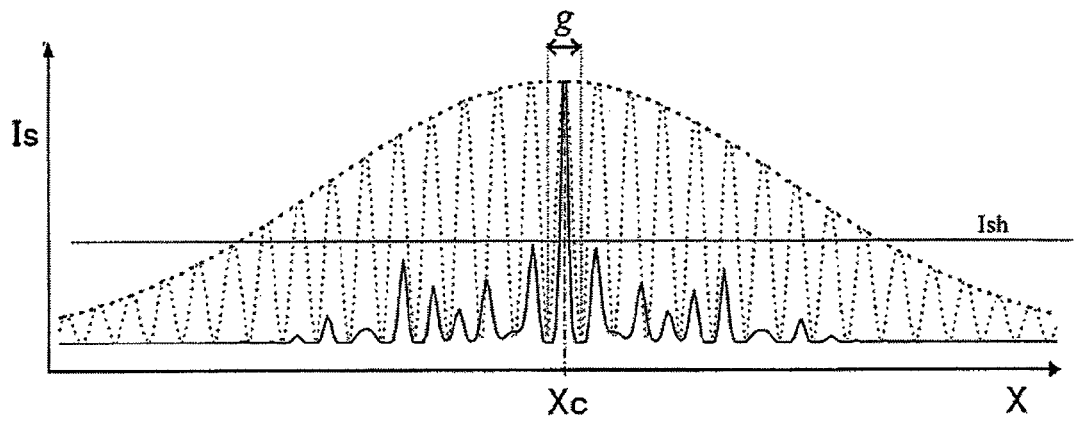
FIG. 5C is a graph of a squared signal Is which is obtained as an example procedure for producing a reference signal proceeds in the encoder according to the embodiment.
Figure 6:
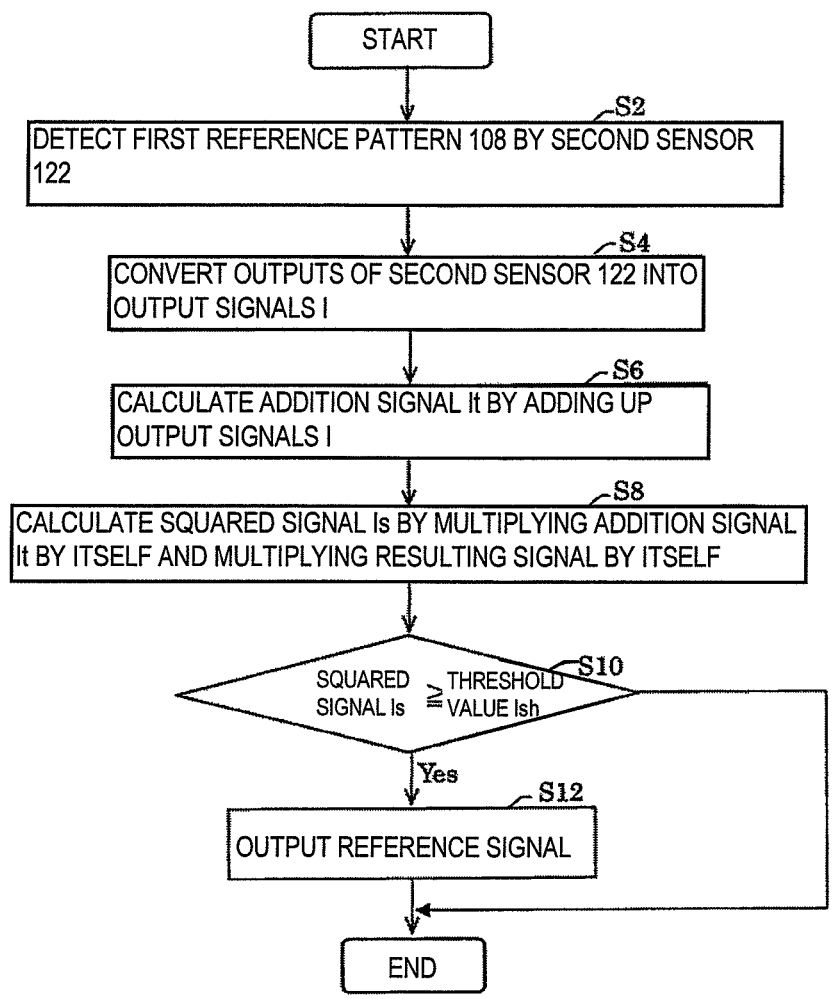
FIG. 6 is a flowchart of the example procedure of FIGS. 5A-5C.

The square calculating section 130 which is connected to the addition calculating section 128 (see FIG. 4) calculates a squared signal Is by squaring the addition signal It m or more times (m: integer). The square calculating section 130 may be a series connection of m squaring circuits 130A. As shown in FIG. 5C, the thus-constructed square calculating section 130 can make the peak at the position Xc even high and sharper and make its width narrower.

The addition calculating section 128 and the square calculating section 130 may be either digital circuits or analog circuits. Where they are analog circuits, high-speed processing is enabled at a low cost. The number m is determined as appropriate in relation to the processing time, the circuit scale, etc.

The judging section 132 which is connected to the square calculating section 130 (see FIG. 4) outputs a reference signal while the squared signal Is is larger than or equal to a threshold value Ish. That is, the judging section 132 outputs a reference signal for determination of a reference position according to signal levels of the squared signal Is. The threshold value Ish is determined in advance on the basis of a result of a preliminary experiment or the like so as to have such a value as to enable proper determination of a reference position and not to be buried in noise.

With the above configuration, the encoder 100 can output a signal indicating a movement length of the main scale 102 on the basis of an output of the first sensor 120 using, as a reference, a reference position which is determined on the basis of output signals of the second sensor 122.

Next, an example procedure for producing a reference position in the encoder 100 will be described by mainly referring to FIGS. 5A-5C and FIG. 6. The procedure will be described for a case that the second reference pattern 116 of the index scale 112 and the first reference pattern 108 of the main scale 102 just coextend with each other optically. FIGS. 5A-5C show actual measurement results of the output signals I, the addition signal It, and the squared signal Is of a case that the width L of the first reference pattern 108 is 300 µm, the pitch g of the first main signal pattern 106 is 10 µm, the value $\Delta g$ is 2 µm, n=1, and m=2.

First, at step S2 (see FIG. 6), the second sensor 122 of the detection unit 118 detects the first reference pattern 108.

At step S4, the signal conversion section 126 of the signal processor 124 converts outputs of the second sensor 122 into output signals I. FIG. 5A show example output signals I (I1, I2, and I3) produced at this step.

At step S6, the addition calculating section 128 calculates an addition signal It by adding up the output signals I. FIG. 5B shows an example addition signal It (=I1+I2+I3) produced at this step.

At step S8, the square calculating section 130 calculates a squared signal Is by multiplying the addition signal It by itself and multiplying a resulting signal by itself. FIG. 5C shows an example squared signal Is $(=(It^2)^2)$ produced at this step.

At step S10, the judging section 132 compares the squared signal Is with a threshold value Ish. In this example, the threshold value Ish is equal to 40% of the maximum value of the squared signal Is.

At step S12, the judging section 132 outputs a reference signal if the squared signal Is is larger than or equal to the threshold value Ish. If not, the judging section 132 does not output a reference signal.

As described above, in the embodiment, the pitch of at least one pattern of the first reference pattern 108 is set smaller than the pitch g of the first main signal pattern 106. As shown in FIGS. 5B and 5C, squaring an addition signal It makes it possible to increase the peak value at the position Xc where output signals I of the second sensor 122 have peaks (these peaks pile up whereas the other peaks do not) and make the peak width narrower than the pitch g (the peak is sharpened). As a result, through the comparison with the threshold value Ish, a reference signal can be output only during a period corresponding to a peak width, around the position Xc, of a sharp squared signal Is.

According to the embodiment, a reference signal can be generated on the basis of a sharp pulse signal which is narrower than the pitch g of the first main signal pattern 106. As is apparent from FIG. 5C, even if the first reference pattern 108 is detected by moving the detection head 104 from either side of the reference in the measurement axis X direction, a reference position can be determined within the pitch g of a signal that is obtained by detecting the first main signal pattern 106. That is, even if the detection head 104 is moved from either side, a reference position can be determined stably and a position Xc that is obtained by detecting the first main signal pattern 106 is prevented from fluctuating.

In the embodiment, each pattern of each of the first reference pattern 108 and the second reference pattern 116 has a constant pitch. This makes it possible to simplify the structures of the first reference pattern 108 and the second reference pattern 116, that is, prevent their patterns from becoming complex. In addition, in the example with actual measurement data, each of the first reference pattern 108 and the second reference pattern 116 employs only three different pitches. This makes it possible to form the patterns with higher accuracy while making the pattern formation cost lower than, for example, in the case of forming random patterns that vary continuously.

In each of the first reference pattern 108 and the second reference pattern 116, (2n+1) patterns are arranged in the measurement axis X direction. Therefore, the widths in the Y direction of the main scale 102 and the index scale 112 can be made smaller than in a case that the first reference pattern 108 and the second reference pattern 116 are arranged in the Y direction.

As such, the embodiment makes it possible to increase the reproducibility of detection of a reference position while simplifying the structures of the first reference pattern 108 and the second reference pattern 116.

Although the invention has been described using the embodiment, the invention is not limited to it. It goes without saying that improvements and design modifications are possible without departing from the spirit and scope of the invention.

For example, although in the embodiment the first reference pattern 108 is formed by at least three patterns (n=1) in such a manner that their pitches are different from each other by a fixed value $\Delta g$, the invention is not limited to such a case. For example, the first reference pattern may be formed by two patterns. Furthermore, it suffices that the patterns of the first reference pattern have different pitches; it is not necessary that the pitch difference be fixed. The advantages of the invention can be obtained as long as the pitch of at least one of the patterns (which is at least two in number) of the first reference pattern is smaller than the pitch of the first main signal pattern 106.

In the embodiment, as shown in FIG. 1, the encoder 100 is the reflection photoelectric linear encoder having the index scale 112 and a movement length of the main scale 102 is calculated according to the three-grating principle. However, the invention is not limited to such a case. For example, the invention can also be applied to a reflection or transmission photoelectric linear encoder in which a movement length of the main scale is calculated not according to the three-grating principle. The invention can also be applied to an encoder that is not a linear encoder which has a straight measurement axis X, such as a rotary encoder having a circular measurement axis X. Furthermore, the invention can be applied to encoders other than a photoelectric encoder (i.e., encoders employing other detection methods), such as a magnetic encoder or a capacitive encoder having a periodic electrode pattern or an electromagnetic encoder having a periodic coil pattern.

The invention can be applied broadly to linear encoders and rotary encoders that require output of a reference signal, as well as encoders that employ various detection methods and require output of a reference signal such as photoelectric encoders, magnetic encoders, capacitive encoders, and electromagnetic encoders.

What is claimed is:

1. An encoder comprising:
  a main scale having a first main signal pattern being periodic in a measurement axis direction and a first reference pattern for determination of a reference position in the measurement axis direction;
  a first sensor and a second sensor which are opposed to the main scale and are movable relative to the main scale in the measurement axis direction, the first sensor detecting a variation of the relative position of the first main signal pattern in the measurement axis direction, the second sensor detecting how close to the second sensor the first reference pattern is located; and
  a signal processor configured to output a signal indicating a movement length of the main scale on the basis of an output signal of the first sensor using, as a reference, a reference position that is determined on the basis of an output signal of the second sensor, wherein:
  the first reference pattern has a plurality of patterns which are arranged in the measurement axis direction and have the same width in the measurement axis direction, the plurality of patterns have respective different pitches and are periodic in the measurement axis direction, at least one of the plurality of patterns being smaller in pitch than the first main signal pattern;
  the second sensor has a plurality of detection regions which are in one-to-one correspondence with the plurality of patterns of the first reference pattern; and
  the signal processor comprises:
  an addition calculating section configured to calculate an addition signal by adding up output signals of the plurality of detection regions of the second sensor;
  a square calculating section configured to calculate a squared signal by squaring the addition signal at least once; and
  a judging section configured to output a reference signal for determination of a reference position according to signal levels of the squared signal.

2. The encoder according to claim 1, further comprising:
  an index scale which is opposed to the main scale and is movable relative to the main scale in the measurement axis direction and has a second main signal pattern and a second reference pattern which correspond to the first main signal pattern and the first reference pattern, respectively, wherein:

the first sensor and the second sensor are photoelectric sensors; and the first sensor detects light coming from the second main signal pattern via the first main signal pattern and the second sensor detects light coming from the second reference pattern via the first reference pattern.

* * * * *